United States Patent [19]

Nicholas

[11] Patent Number: 5,117,866
[45] Date of Patent: Jun. 2, 1992

[54] AIR FLOW REGULATOR FOR FUEL MEASURING SYSTEMS

[75] Inventor: John C. Nicholas, Rockville, Md.

[73] Assignee: Pulse Electronics, Inc., Rockville, Md.

[21] Appl. No.: 632,333

[22] Filed: Dec. 21, 1990

[51] Int. Cl.⁵ .............................................. F16K 51/00
[52] U.S. Cl. .................................. 137/561 A; 137/550
[58] Field of Search .............. 137/561 A, 550; 138/42

[56] References Cited

U.S. PATENT DOCUMENTS

| | | | |
|---|---|---|---|
| 4,387,736 | 6/1983 | Major | 137/550 |
| 4,795,401 | 1/1989 | Ende | 138/42 X |
| 4,807,663 | 2/1989 | Jones | 137/561 A |

Primary Examiner—John C. Fox
Attorney, Agent, or Firm—Whitham & Marhoefer

[57] ABSTRACT

An improved "air box" for fuel measuring systems eliminates the regulator, filter and needle valve and replaces those components with a manifold and simple flow restrictor. In a preferred embodiment, three flow restrictors made of a porous, sintered metal are used in a low pressure outlet fitting which is threadably attached to the manifold. The air flow restrictor assemblies can be easily removed from the air box manifold and cleaned or replaced.

4 Claims, 3 Drawing Sheets

AIR FLOW REGULATOR FOR FUEL MEASURING SYSTEMS

BACKGROUND OF THE INVENTION

1. Field of the Invention

The present invention generally relates to fuel measuring systems and, more particularly, to an improvement in the air flow regulator of the so-called bubble type fuel measuring systems.

1. Description of the Prior Art

U.S. Pat. No. 4,840,056 to Emilio A. Fernandez et al. describes a fuel measuring system which measures diesel fuel in a fuel tank on a locomotive. In this system, air from the locomotive at 120 to 140 psi is supplied to a regulator and filter to reduce and regulate the pressure to 8 psi. The regulated low pressure air is then supplied to a needle valve which is adjusted to supply a flow of 225 ml/min. to the fuel measuring system. The air regulator and needle valve are typically housed in a common case, which is known in the art as an "air box".

The needle valve is subject of fouling due to contaminants in the air supply, thus requiring an efficient air filter. Both the air filter and the regulator are expensive, adding to the cost of the fuel measuring system.

SUMMARY OF THE INVENTION

It is therefore an object of the present invention to provide an improved "air box" for fuel measuring systems which is both more reliable and less expensive than the prior "air box" used in such systems.

According to the invention, the regulator, filter and needle valve are all eliminated and replaced with a manifold and simple flow restrictor. In a preferred embodiment, three flow restrictors made of a porous, sintered metal are used in a low pressure outlet fitting which is threadably attached to the manifold. The low pressure outlet fitting can be easily removed from the air box manifold and cleaned or replaced.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
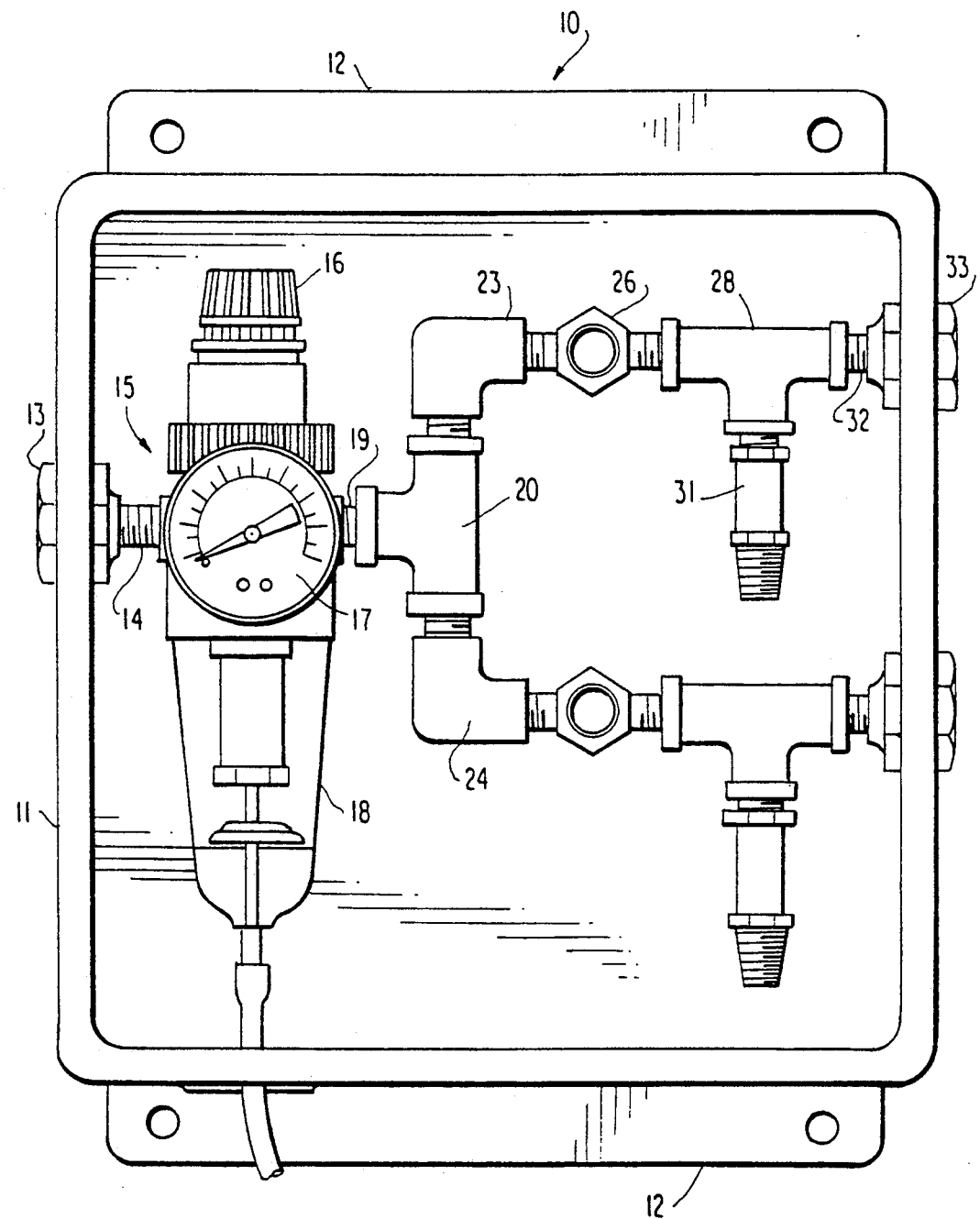
FIG. 1 is a plan view of the prior art "air box" with its cover removed to show the components of that device.

Referring now to the drawings, and more particularly to FIG. 1, there is shown the prior art "air box" 10. The "air box" comprises a case 11 having flanges 12 for bolting to a vertical surface in a railroad locomotive. A hinged and lockable cover (not shown) is provided to enclose and protect the contents of the "air box" 10. The "air box" is shown with the cover removed to expose the components which control and regulate the air flow to a fuel measuring system of the type disclosed in the Fernandez et al. U.S. Pat. No. 4,840,056.

A high pressure inlet fitting 13 is provided on the left hand side wall of the case 11. This fitting is adapted to be connected to a source of high pressure locomotive air. A pipe nipple 14 connects fitting 13 to a pressure regulator 15. The pressure regulator itself comprises a pressure adjusting knob 16, a pressure gauge dial 17 and an air filter 18. The outlet of the pressure regulator 15 is connected by a pipe nipple 19 to a union Tee 20, which provides two branch paths for air flow. Pipe elbows 23 and 24 are joined to respective arms of the Tee 20. The elbow 23 is joined to needle valve assembly 26 which, in turn is connected to union Tee 28. One outlet of the union Tee 28 is connected to a check valve 31, and the other outlet of the union Tee 28 is connected via pipe nipple 32 to low pressure outlet fitting 33 mounted in the right hand side wall of case 11. The components connected to the pipe elbow 24 are identical to those just described. The reason for two branches is dictated by the specific fuel measuring system to which the air is supplied.

In operation, unregulated air from the locomotive at 120 to 140 psi is supplied to the high pressure fitting 13. The air pressure regulator 15 reduces and regulates the pressure to 8 psi. This low pressure air is then supplied to one or more needle valve assemblies 26 which are used to adjust the flow of air to approximately 225 ml/min. to the fuel measuring system. In practice, the flow range can be from 18 ml/min. to 2 l/min. The filter 18 is required to protect the needle valves from fouling since the air from the locomotive may contain contaminants.

Figure 2:
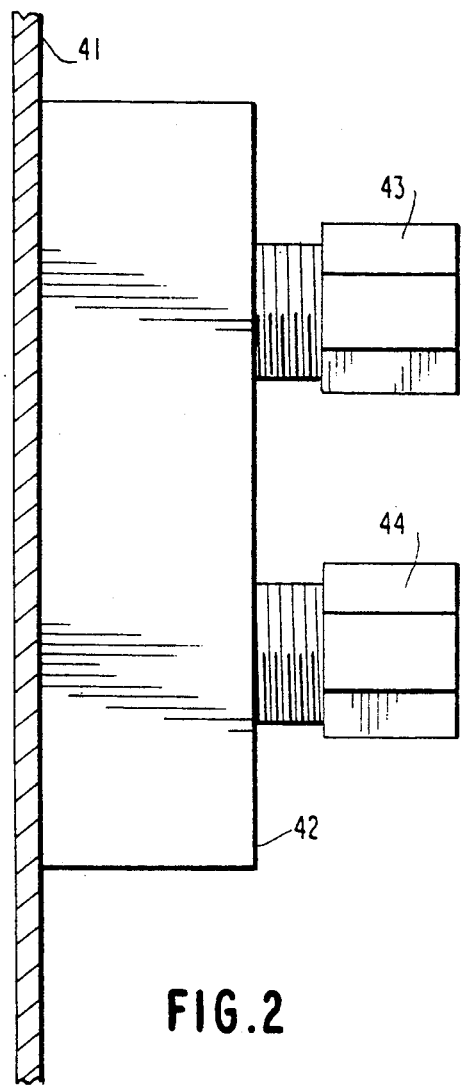
FIG. 2 is a side view of the new "air box" according to the present invention.
Figure 3:
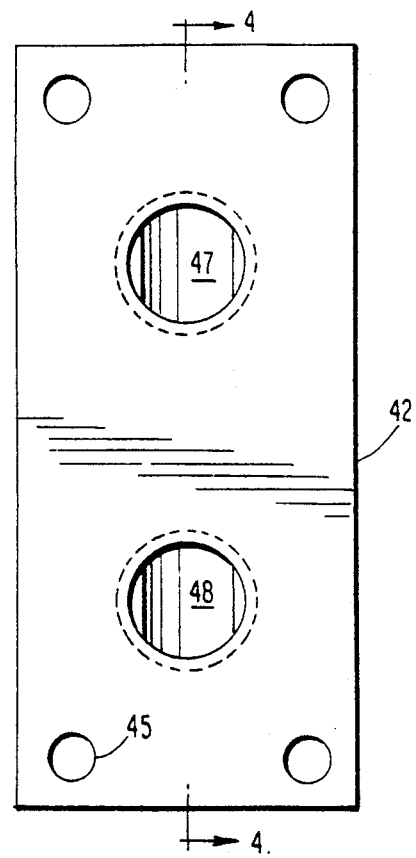
FIG. 3 is a plan view of the air manifold of the "air box" shown in FIG. 2.
Figure 4:
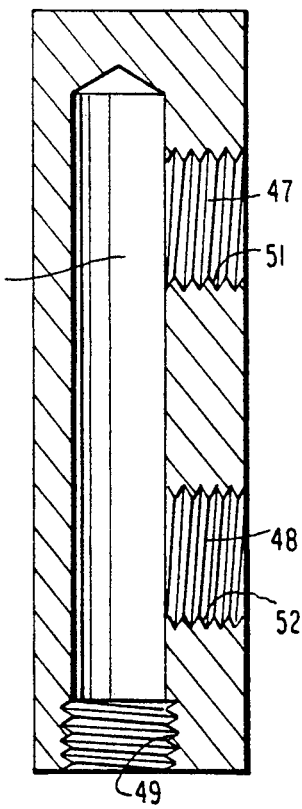
FIG. 4 is a cross-sectional view taken along section line 4—4 in FIG. 3.

According to the present invention, the large and expensive "air box" shown in FIG. 1 is replaced by the simple manifold and flow restrictor assemblies shown in FIG. 2. This assembly is shown mounted to a vertical surface 41 in the locomotive and comprises a manifold body 42 and two flow restrictor assemblies 43 and 44. FIG. 3 shows the manifold body 42 in plan view provided with screws 45 in each of its four corners for mounting. The cross-sectional view of the manifold body shown in FIG. 4 is taken along section line 4—4 in FIG. 3 and shows the simplicity of this part. A rectangular block of aluminum, or other suitable material, is machined with a blind central bore 46 extending from the bottom of the block upwardly toward the top of the block. Perpendicular to and intersecting with this central bore are two air passage bores 47 and 48 which extend from the face of the block into the body of the manifold. The central bore 46 is threaded at its inlet 49 to receive a high pressure inlet fitting (not shown), and the two air passage bores are threaded at their outlets 51 and 52, respectively, to receive the flow restrictor outlet fittings 43 and 44.

Figure 5:
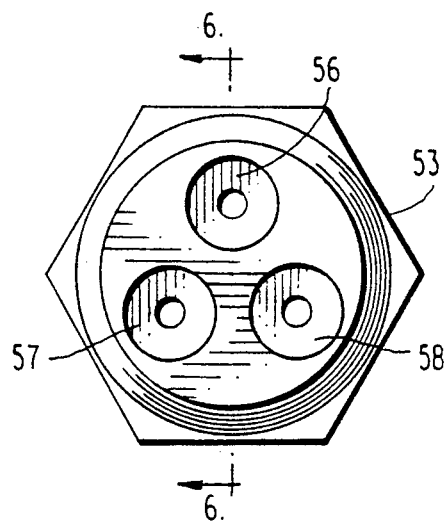
FIG. 5 is an end view of the flow restrictor fitting according to the invention.
Figure 6:
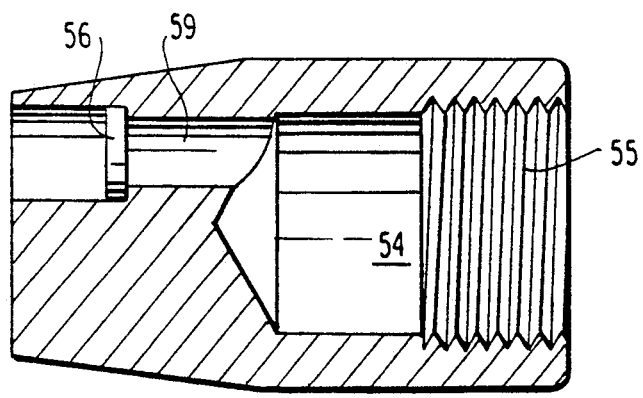
FIG. 6 is a side cross-sectional view taken along section line 6—6 in FIG. 5.

One of the flow restrictor assemblies is shown in FIGS. 5 and 6. FIG. 5 is a left end view, that is, the end that threadably attaches to the manifold 42, while FIG. 6 is a longitudinal cross-sectional view taken along section line 6—6 in FIG. 5. The assembly comprises a hexagonal body 53 having a low pressure outlet bore 54 threaded at is outlet 55 to receive a hose barb fitting (not shown). The inlet end (shown in FIG. 5) is provided with three inlet bores to receive porous, sintered metal flow restrictors 56, 57 and 58. The flow restrictor 56 and one of these inlet bores 59 is shown in the cross-sectional view of FIG. 6, and it will be observed that the inlet bore 59 is stepped to provide a high pressure seat for the flow restrictor 56 and forms a passage which communicates with the outlet bore 54. Suitable porous, sintered metal flow restrictors are available from Mott Metallurgical Corp. of Farmington, Conn.

The flow restrictor assembly shown in FIGS. 5 and 6 was designed with a dirty, high pressure environment in mind. The brass body is machined with three inlet holes that have tightly toleranced diameters. These tightly toleranced dimensions allow the press fitting of the flow restrictors into the holes without allowing any possible air leakage under high pressure conditions, the hole seats or ledges at the end of the flow restrictor holes prevent the flow restrictors from being pushed further into the fittings by the high pressure air flowing through the flow restrictors.

This structure completely replaces the "air box" 10 shown in FIG. 1. The air flow regulator according to the invention needs only one flow restrictor to control the air flow. Redundancy is added to the flow restrictor assembly with the addition of the other two flow restrictors. This ensures that the regulator will not be readily clogged if a large quantity of dirt, oil, or sludge passes through the system. The flow of air to the fuel measurement system will be adequate even if only part of one flow restrictor remains passable.

The design of the manifold and operational position of the air flow regulator was also undertaken with the dirty environment in mind. The orientation of the manifold vertically with the high pressure inlet located at the bottom creates a filter trap to prevent large contaminants from entering the flow restrictor fittings. The use of gravity and a minimal air flow rate hinders the movement of contaminants up into the central bore 46 in FIG. 4. The flow restrictors themselves also function as filters providing the fuel measuring system with a regulated and clean flow of air.

The air flow regulator according to the invention does not control the pressure of the air leaving it; it only controls the flow rate of the outlet air. The outlet air pressure is determined by the column height of the fuel in the locomotive tank. This pressure is what the fuel measuring system monitors to determine the number of gallons of fuel in the tank. The original "air box" shown in FIG. 1 required the regulation of the air pressure because the needle valves could not control the flow rate of high pressure air. The air flow regulator according to the invention can handle high pressure air without the addition of a pressure regulator to the system, thus reducing the cost and complexity of the air flow regulator.

Maintenance is also reduced. The flow restrictors are easily cleaned or replaced by simply removing the flow restrictor assemblies. Cleaning may be done by pulsing high pressure air in reverse direction through the flow restrictors. Alternatively, the flow restrictor assemblies may be treated as a disposable item to be replaced at periodic intervals.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An improved "air box" for a fuel measuring system of the so-called bubble type comprising:
    a manifold body having a vertical central bore with a high pressure inlet at a lower end of said manifold body and at least one bore intersecting said central bore; and
    a flow restrictor assembly threadably attached to said manifold at said intersecting bore, said flow restrictor assembly including a body having an outlet bore and at least one inlet bore in communication with said outlet bore, said inlet bore having a stepped diameter forming a seat, said flow restrictor assembly also including at least one flow restrictor made of a porous, sintered metal press fit to said seat in said inlet bore, said outlet bore adapted to be connected to supply a regulated flow of air to said fuel measuring system.

2. The improved "air box" recited in claim 1 wherein said manifold body has two bores intersecting said central bore upstream from said high pressure inlet and further comprising two air flow restrictor assemblies, one for each of said two bores.

3. The improved "air box" recited in claim 1 wherein the body of said air flow restrictor assembly has three inlet bores in communication with said outlet bore, each of said inlet bores having a stepped diameter forming a seat, said air flow restrictor assembly having three flow restrictors each made of a porous, sintered metal and press fit to respective ones of said seats in said inlet bores.

4. The improved "air box" recited in claim 3 wherein said manifold body has two bores intersecting said central bore upstream from said high pressure inlet and further comprising two air flow restrictor assemblies, one for each of said two bores.

* * * * *